United States Patent
Sanchez

(10) Patent No.: US 8,315,184 B2
(45) Date of Patent: Nov. 20, 2012

(54) COMPUTER TO MOBILE TWO-WAY CHAT SYSTEM AND METHOD

(75) Inventor: Robert Sanchez, San Diego, CA (US)

(73) Assignee: Globaltel Media, Inc., San Diego, CA (US)

( * ) Notice: Subject to any disclaimer, the term of this patent is extended or adjusted under 35 U.S.C. 154(b) by 332 days.

(21) Appl. No.: 12/651,342

(22) Filed: Dec. 31, 2009

(65) Prior Publication Data

US 2011/0151899 A1 Jun. 23, 2011

Related U.S. Application Data

(63) Continuation-in-part of application No. 12/641,288, filed on Dec. 17, 2009.

(51) Int. Cl.
*H04L 12/56* (2006.01)
*H04J 1/16* (2006.01)
(52) U.S. Cl. ......... 370/252; 370/329; 370/389; 370/430
(58) Field of Classification Search .................. 370/252, 370/329, 389, 430
See application file for complete search history.

(56) References Cited

U.S. PATENT DOCUMENTS

| 7,889,716 B2* | 2/2011 | Tejani et al. ................. 370/352 |
| 2002/0174248 A1 | 11/2002 | Morriss |
| 2006/0069736 A1 | 3/2006 | Czeisler et al. |
| 2007/0287484 A1* | 12/2007 | Chava et al. ................. 455/466 |
| 2011/0123005 A1* | 5/2011 | Segall et al. ............... 379/88.13 |
| 2012/0134330 A1* | 5/2012 | Yoon et al. .................... 370/329 |

OTHER PUBLICATIONS

Non-Final Office Action dated Dec. 8, 2011, for related U.S. Appl. No. 12/641,288.

* cited by examiner

*Primary Examiner* — John Pezzlo

(74) *Attorney, Agent, or Firm* — Mintz, Levin, Cohn, Ferris, Glovsky and Popeo, P.C.

(57) ABSTRACT

Systems and methods are provided for a two-way chat. In one aspect there is provided a system including a processor, which further includes a memory. The processor and memory provide a web client application. The system further includes a mobile wireless device and a centralized server. The centralized server provides a two-way chat between the web client application and the mobile wireless device.

21 Claims, 14 Drawing Sheets

| Technology Decision | Requirement/Solution | Metrics |
|---|---|---|
| Java NIO technology | Helps in supporting a large number of concurrent connections. | One NIO based chat server can support 1500 concurrent connections. |
| Java Messaging Service (JMS) | Helps in asynchronous handling of replies – avoids waiting for replies | Supports 2000 concurrent request / replies |
| Load Balancer | Makes sure the load is evenly distributed across multiple NIO server | We can scale out the architecture as needed so more number of users can chat. |
| MySql Database cluster | Ensures that database does not become a bottleneck | End user does not wait long for the request/reply loop to perform. |
| Multi-threading | Ensures optimum use of multiple CPUs and optimizes IO throughput. Also ensures good JMS queue consumption. | We can simultaneously send 4 or 5 chat requests. |
| JBoss App Server clustering | Ensures resource pooling so available resources is used optimally. | Scales out so more number of users can chat. |

FIG. 3

FIG. 10
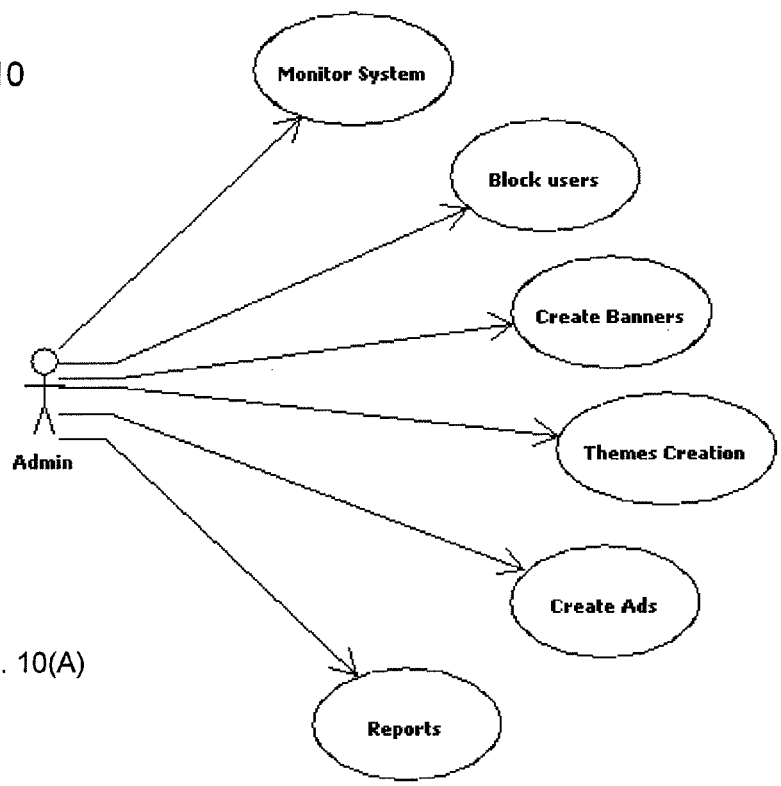
FIG. 10(A)
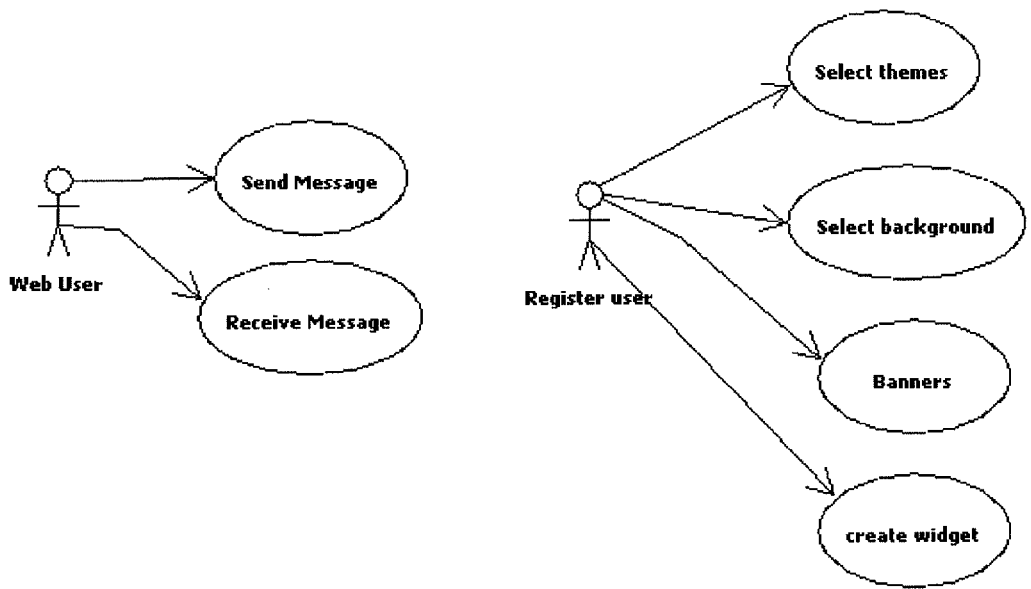
FIG. 10(B)
FIG. 10(C)

ns and METHOD

CROSS REFERENCE TO RELATED APPLICATION

This Patent Application is a Continuation-In-Part of U.S. patent application Ser. No. 12/641,288, filed on Dec. 17, 2009, Entitled "Computer To Mobile Two-Way Chat System And Method," the contents of which are hereby incorporated by reference in its entirety.

FIELD OF INVENTION

This disclosure relates generally to "chat" systems, i.e. a user-driven, text-based communication technique for two-way communications between computing devices. More particularly, this disclosure relates to a two-way chat system and method between a personal computer (PC) and a mobile device.

BACKGROUND

The mobile cellular market has over 280 million cell phone users in the US alone. Globally, there are over 3.2 billion cell phone users. Text messaging (aka Short Message Service (SMS)) works on all cell phones and has become the preferred method of communication of the wireless world with nearly 3 trillion messages expected to be sent in 2008. In the US, text-messaging statistics continue to double and even triple analyst forecasts in the 2008 topping nearly 48 billion text messages per month.

All age groups, but especially teenagers, youth, college students and young professionals, have embraced "texting" as a preferred form of communication. For many parents, the only way to communicate with your children is through text messaging, because text messaging is cheap, fast, easy to use, private, personal, reliable, real time and non-disruptive. However, texting is not yet a viable form of communication from a web-connected computer, such as a PC or laptop computer, to one or more mobile devices.

SUMMARY

The subject matter described herein relates to a system and method for a two-way chat and, in particular, wireless solutions that enable two-way short message service (SMS) communications from any internet-connect personal computer (PC) to any mobile cellular phone and back to that same PC.

In one aspect there is provided a system including a processor, which further includes a memory. The processor and memory provide a web client application. The system further includes a mobile wireless device, and a centralized server. The centralized server provides a two-way chat between the web client application and the mobile wireless device.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.
FIG. 3 is a table of preferred technology to implement a chat system.
FIGS. 10A-10M illustrate various functions of a chat system.
Like reference symbols in the various drawings indicate like elements.

DETAILED DESCRIPTION

This subject matter described herein relates to a two-way, PC-to-mobile device texting or "chat" system and method. The system and method may be implemented as a standalone application that is installed on any internet-connected PC (whether on a website or the Internet Explorer bar) to allow real-time, two-way SMS communications from the chat application to/from any mobile cellular phone registered and located in, for example, the US.

Figure 1:
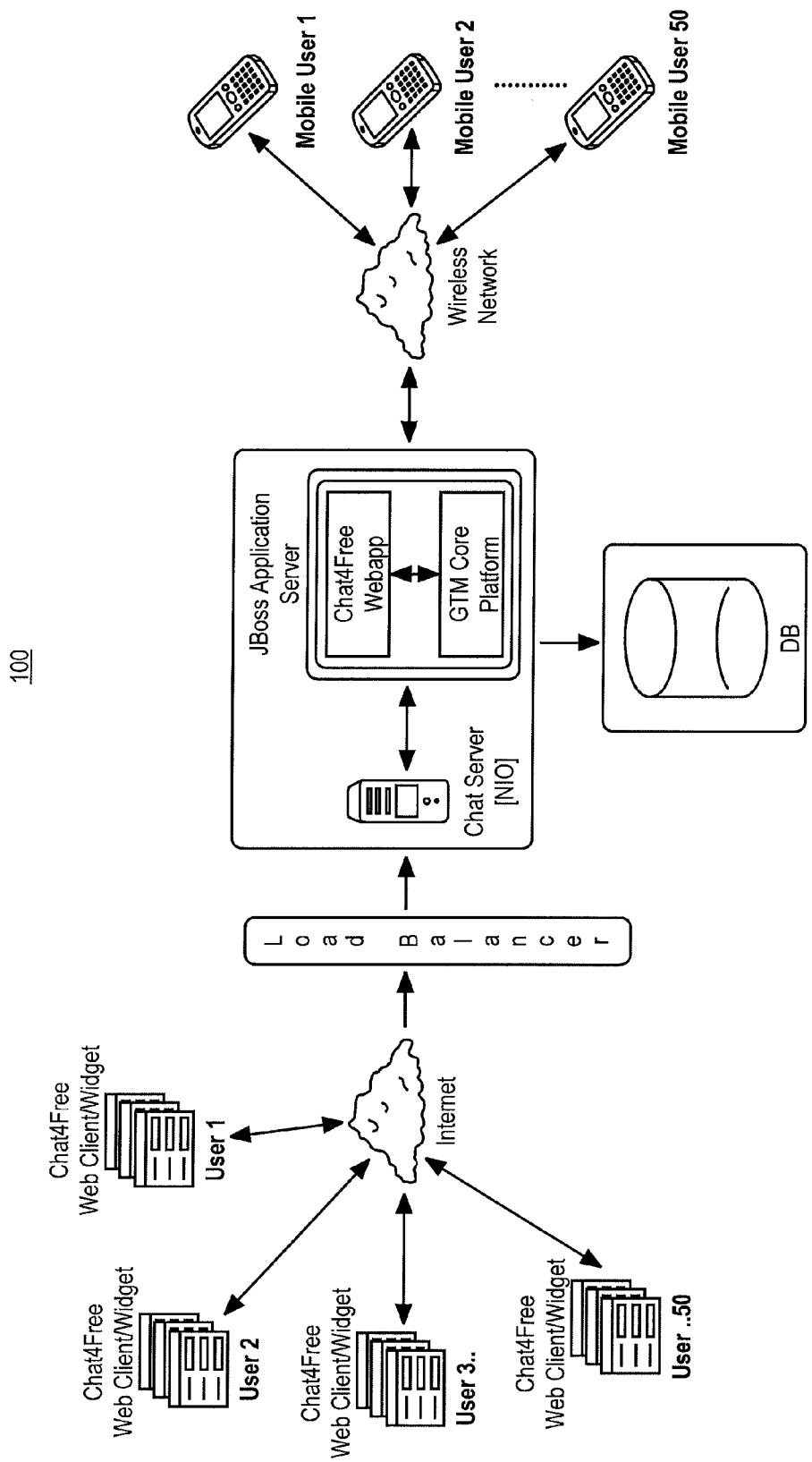
FIG. 1 illustrates a chat system.

FIG. 1 shows the deployment of the chat system and high-level view of the integral parts of the system 100. The web-enabled chat widget (e.g., 110) enables a user on the web to send a message to a mobile number of their choice and start a two way chat with the mobile user (e.g., mobile user 112). The chat system can allow a web user to maintain multiple, if not tens or hundreds, of chat sessions simultaneously. The chat system includes the following components:

Chat Server (NIO) which is a high performance chat server running as the initial contact point it delegates the message sending and validation to the backend (webapp) for further interactions with a core platform to send the message over to the mobile user.

Core Platform: The core platform sends and receives the text messages to and from the mobile user via the wireless network.

Chat system Webapp: The chat system Webapp is the main chat system providing application logic for Administration, MMA compliance and related activities.

Mobile User: The mobile user (which includes a mobile wireless device) who is an end point in the receiving flow of chat messages initiated by the web user. Once this user OPTS-IN for chat, then the two-way chat begins.

Figure 2:
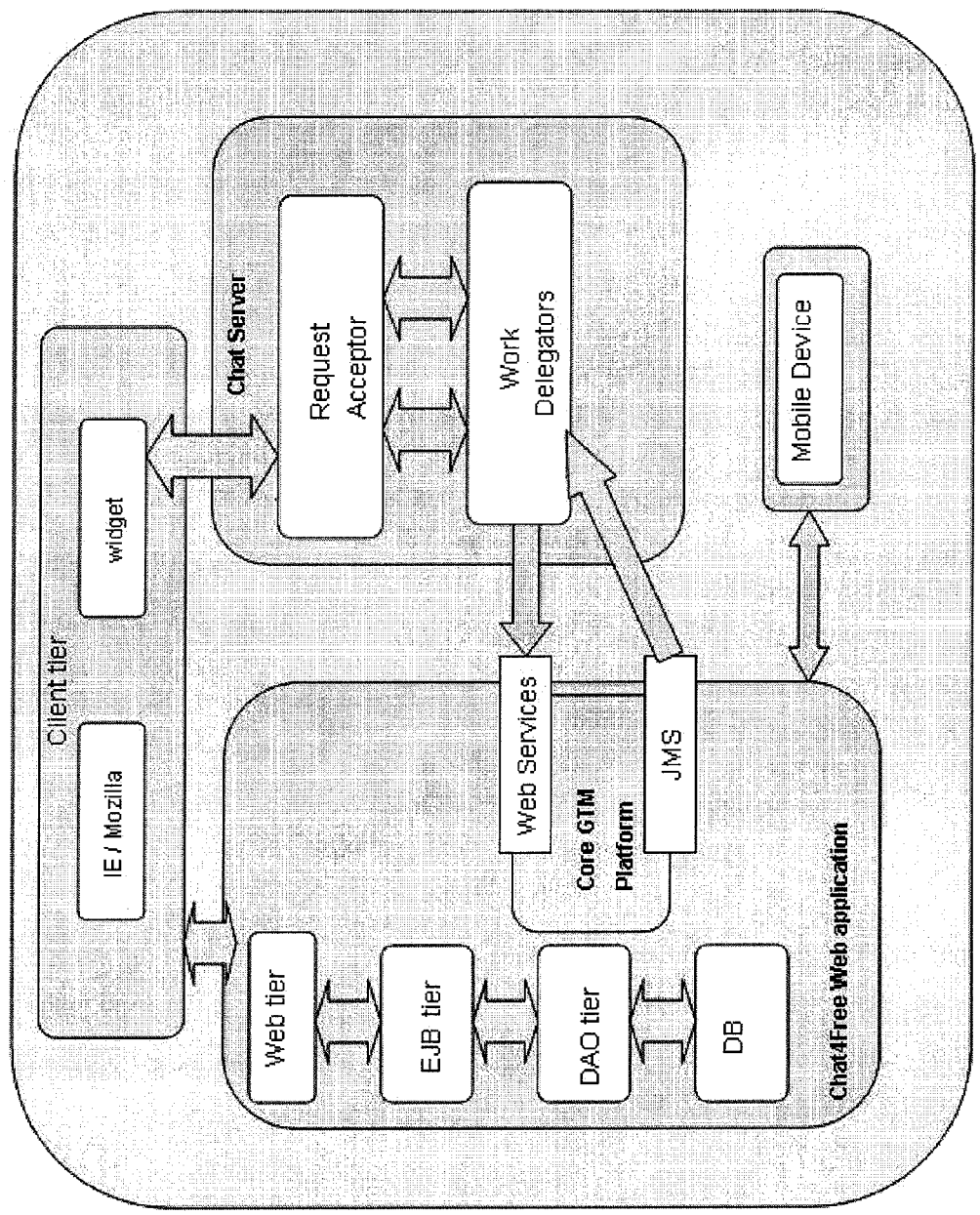
FIG. 2 is a pictorial representation of the chat system application/system architecture.

FIG. 2 is a pictorial representation of the chat system application/system architecture, depicts the different layers, components and various J2EE technologies used in the system. The system depicted at FIG. 2 has a layered architecture to alleviate the changes from layer to layer. The intended layered architecture approach at the server/web application stack consists of different components as shown at FIG. 2, which includes a Client (flash/html), a Web tier (Struts Layer, JSP, CSS, HTML, and Javascript), an EJB tier, a DAO tier, and a relational database management system (RDBMS).

The chat application is preferably a self-contained executable application that can be sent or received via email attachment. In use, upon double-click of the chat system executable application, the application installs the software onto the user selected target environment of either a website, or the Internet Explorer menu bar, or other area of the PC user's screen or user interface. The application determines the configuration and capabilities of the PC including, but not limited to, the operating system, hardware, software and internet-connectivity. The application installs the necessary software and applets into a default folder. In addition to the executable software, the application may also install a text file with the licensing agreement with the user terms and conditions. Also, if any third party software is required, the application may download the required third party software. Upon completion of the installation, the chat application generates a request to ask the user if they desire to start the application.

Menu bar includes pull down tabs:
File
   Start New Chat—clears chat screen, keeps user_name intact, requests new phone number)
   Customize—Allows user to enter in user_name)
   Exit—Closes application
Help
   Help
   Getting Started
   Customer Support Information
   Terms & Conditions of Use In preferred, exemplary implementations of the chat system, the chat Web application design components include the following:

Client tier: The client tier provides web pages or flash widget, which captures and render the data in the required display format. This layer is the responsible for capturing the data from the user. This layer uses the "AJAX" technique wherever the data or page needs to be updated in asynchronous calls Web tier: The web tier predominantly consists of JSP's, JavaScripts, CSS and other UI (user interface) related content, makes use of Struts which is a framework based on the MVC paradigm, and does the interactions with the model/backend/data/EJB layer.

EJB tier: This layer is responsible for the business objects/entities used in the system and the cross entity interactions, and makes use of stateless session beans to be highly efficient and scalable.

DAO tier: The above session beans/business objects in turn talk to the RDBMS through Data Acess Objects (DAO), which abstract the business objects from the mundane database access operations (e.g., CRUD operations).

Core Platform: The core platform for messaging applications which consists of message sending and receiving APIs in addition to platform exception handling, as well as remote/webservices support for communication with external applications.

The chat server is configured to be highly available, asynchronous, and a lightweight or "thin" coded system. This has intricate thread models to help achieve the design objectives and performance, using chat server design components as follows:

Request Acceptor: This layer/component is responsible for receiving incoming requests; it delegates the processing to other layer. This effectively makes this layer totally a high available system that listens for incoming request to suit the chat server.

Work Delegators: This layer/component is fully asynchronous and handles a multiplicity of threads to share the load of processing for all chat requests. This layer is responsible for the processing of messages both inward and outward. The chat message from the user are processed and sent to mobile using webservices provided in the chat system. Similarly, responses from the mobile are received from the JMS system/interface exposed by the chat system.

Some of design aspects handling non-functional requirements include supporting a large number of concurrent connections, as well as asynchronous handling of replies to avoid waiting for replies. These aspects ensure that the load is evenly distributed across multiple chat servers, that database does not become a bottleneck, optimum use of multiple CPUs, optimum input output throughput, and that JMS queue consumption is used to ensure resource pooling so that available resources are used optimally.

FIG. 3 is a table of technology decisions and related requirement/solutions and metrics for an exemplary chat system, application, and technology components thereof.

The actors and their function in various chat system use cases are described below. This is not a comprehensive list of all actors in the system but only the major actors for the chat system aspects of the application.

Administrator:
a) Spam control and blocking unauthorized users.
b) Centralized theme management, Banners/Ads management.
c) Reports.

Users
a) The regular user (Chat Initiator) can send message texts to the mobile user and receive message text from the mobile user.
b) The mobile user can send message texts to the mobile user and receive message text from the web user.

Registered User
a) Same as user, but with the following additional function:
a) Customize own widget
   Uploading of images as background images.
   Change of size, colors and font sizes of widget.
   Can choose different versions of skins.

Figure 4:
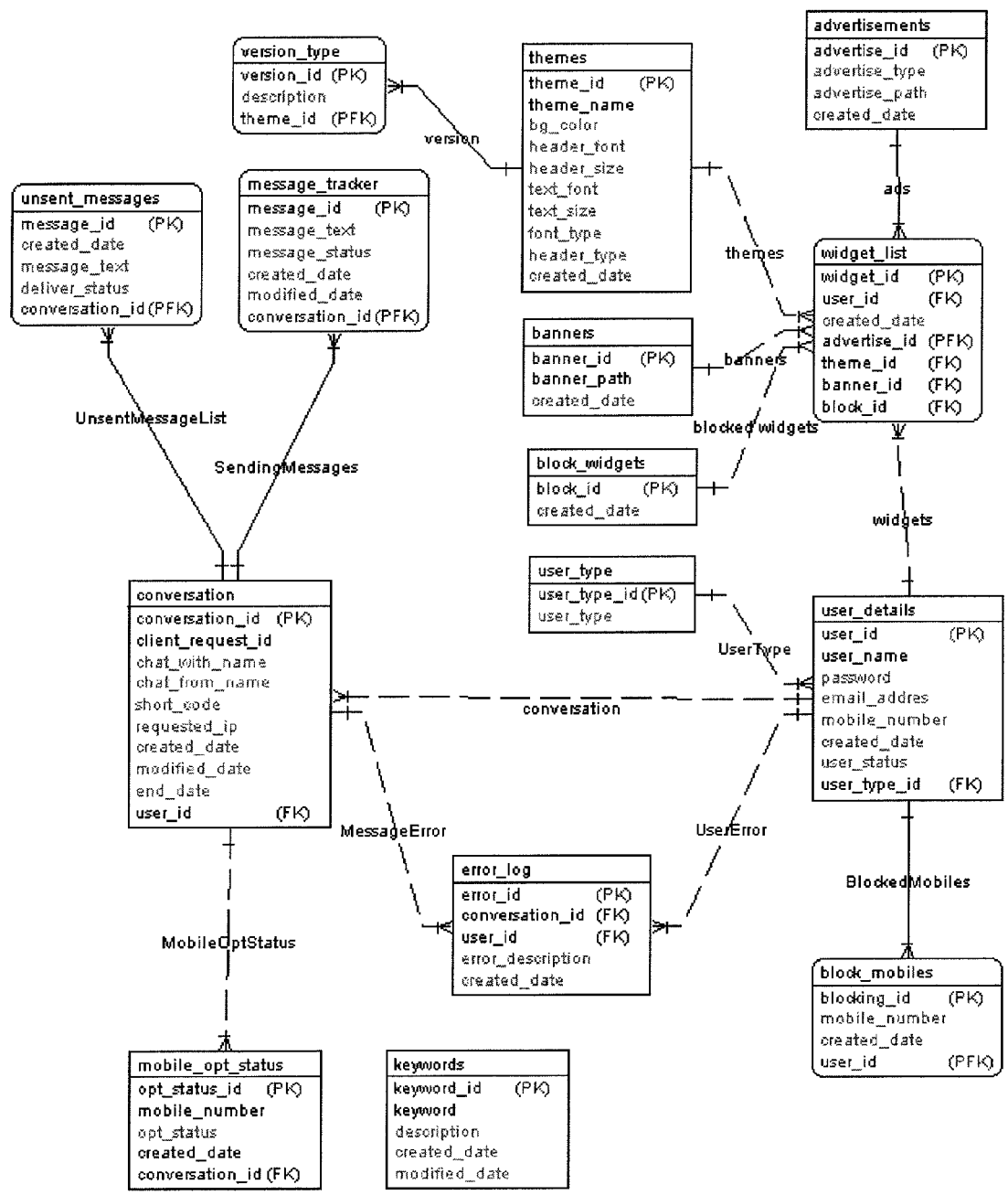
FIG. 4 illustrates an application data model.

Data Model
FIG. 4 illustrates an application data model which covers ER diagrams (representation of the entity relationships) and also lists the core tables and description with keys and data types.

Database Tables

TABLE 1

| Table name | Fields | Type | Description |
|---|---|---|---|
| user_details | user_id (PK) | int | Table for storing all the registered user details. This table contains all type of users including admin and registered users. |
| | user_name | varchar | |
| | password | varchar | |
| | email_address | varchar | |
| | mobile_number | varchar | |
| | user_status | char | |
| | user_type_id(FK) | int | |

TABLE 1-continued

| Table name | Fields | Type | Description |
|---|---|---|---|
| user_type | User_type_id (PK)<br>User_type | int<br>varchar | This table describes different type of users, i.e. admin, user |
| conversation | Conversation_id (PK)<br>Client_request_id<br>Chat_with_name<br>Chat_from_name<br>Short_code<br>Created_date<br>Modified_date<br>End_date<br>User_id(FK) | int<br>varchar<br>varchar<br>varchar<br>varchar<br>varchat<br>Timestamp<br>Timestamp<br>int | Table is for the initiation of chat conversation, system checks this table to see if any conversation is alive for a given mobile number. It also checks for assigned short code. |
| Mobile_opt_status | Opt_status_id (PK)<br>Mobile_number<br>Opt_status<br>Created_date<br>Conversation_id(FK) | int<br>varchar<br>varchar<br>timestamp<br>varchar | Table for storing opt-status of every mobile. For each new conversation system checks each time for the mobile opt status. |
| message_tracker | Message_id (PK)<br>Message_text<br>Message_status<br>Created_date<br>Modified_date<br>Conversation_id(FK) | int<br>varchar<br>varchar<br>timestamp<br>Timestamp<br>int | This table contains stores the sent messages to mobile user and received messages from mobile users. This is a message tracking store. |
| Unsent_message | Message_id (PK)<br>Message_text<br>Deliver_status<br>Created_date<br>conversation_id(FK) | int<br>varchar<br>varchar<br>timestamp<br>int | Table for storing messages that were not delivered from the web |
| error_log | Error_id (PK)<br>Conversation_id(FK)<br>User_id<br>Error_description<br>Created_date | int<br>Int<br>Int<br>Varchar<br>Timestamp | Table for storing all types of error messages including message sending errors and all the types of user and widget creation error messages. |
| keywords | Keyword_id (PK)<br>Keyword<br>Description<br>Modified_date<br>Created_date | int<br>Varchar<br>Varchar<br>timestamp<br>Timestamp | Table for containing the entire keywords list, by using this keywords list system can control spam messages |
| banners | Banner_id (PK)<br>Banner_path<br>Created_date | int<br>Varchar<br>timestamp | Banners list, these will be displayed on the widgets |
| advertisements | Adverise_id(PK)<br>Advertise_path<br>Advertise_type<br>Created_date | int<br>Varchar<br>Varchar<br>timestmap | Advertisements list these will be displayed on the widgets |
| Themes | Theme_id(PK)<br>Theme_name<br>Bg_color<br>Header_font<br>Header_size<br>Text_font<br>Text_size<br>Font_type<br>Header_type<br>Varchar<br>Created_date | int<br>Varchar<br>Varchar<br>Varchar<br>Varchar<br>Varchar<br>Varchar<br>Varchar<br><br><br>timestamp | Themes list, which is created by admin and user can select one of the theme from the list |
| Widget_list | Widget_id (PK)<br>User_id(FK)<br>Created_date<br>Advertise_id(FK)<br>Theme_id(FK)<br>Banner_id(FK)<br>Block_id | int<br>Int<br>Timestamp<br>Int<br>Int<br>Int<br>int | Table of storing all the created widgets list and created user |
| block_mobiles | Blocking_id(PK)<br>Mobile_number<br>User_id(FK)<br>Created_date | int<br>Varchar<br>int<br>timestmap | List of blocked mobiles, i.e. mobiles to which conversations are not allowed. |

Notation:
a) Field name followed by a (PK) denotes that this field is the primary key for the table.
b) Field name followed by a (FK) denotes that this field is the foreign key for the table.

Class Listings

The following table lists the main classes of the chat application.

| Package name | Classes | Brief description |
| --- | --- | --- |
| com.gtm.chat4free.dao | UserDAO | Handles the login user operations like Registration. |
| | MessageDAO | Handles the sending and receiving messages. |
| | UnsentMessageDAO | Handles all the undelivered messages. |
| | ReportsDAO | Handles all the themes, banner, advertisement creation and reports view. |
| | BannerDAO | |
| | Advertisement DAO | |
| com.gtm.chat4free.utils | Util | Handles all the generic methods, reusable methods, and uploading images. |
| | DateUtil | |
| | UploadImage | |
| com.gtm.chat4free.common | Constants | Handles all the constants |
| | Encrypt/Decrypt | Handles data encryption and decryption. |
| | MessageHelper | Handles to call web services methods with url specifications. |
| com.gtm.chat4free.service | UserService | Handles all the services operations, like login authentication and Registration. |
| | MessageService | Handles all the sending messages and receiving messages operations. |
| com.gtm.chat4free.bean | MessageMangerBean | Bean which has to receive message from service request and send to queue and also do necessary dao operations. |
| | ReceiveMessageBean | Bean which receives all the response messages from mobile user and also check for spam, block, help kind of messages. |
| | UserManagerBean | Handles user information like login authentication, widget creation. |
| com.gtm.chat4free.delegate | UserDelegate | Handles the UserService method calls. |
| | AdminDelegate | Handles the AdminService method calls |
| com.gtm.chat4free.action | UserAction | Handles the entire request from users. |
| | AdminAction | Handles the entire requests from Admin. |
| com.gtm.chat4free.DBUtils | JDBCConnectionProvider Impl | Handles Database connections |

Overview of Classes

Figure 5:
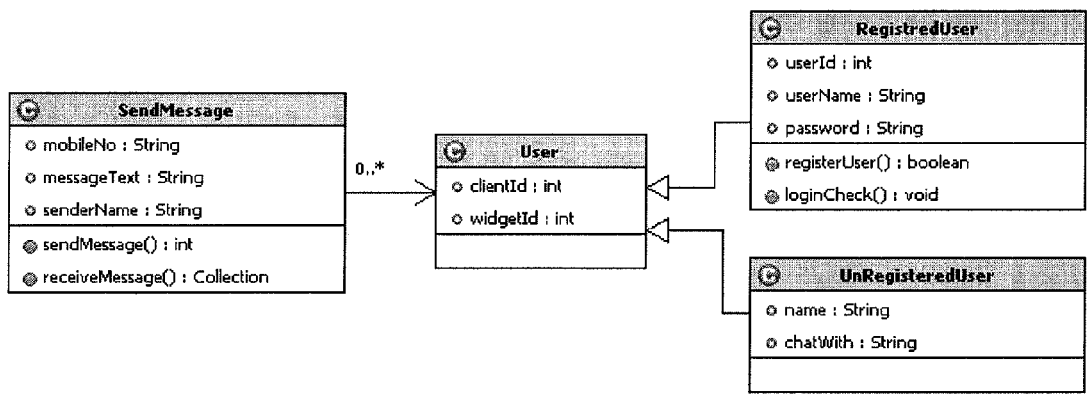
FIG. 5 is a general class diagram.

As shown in FIG. 5, every user can send messages to the given destination mobile number regardless of login credentials. For login user we can list the entire mobile numbers as a report for the feature communications.

Figure 6:
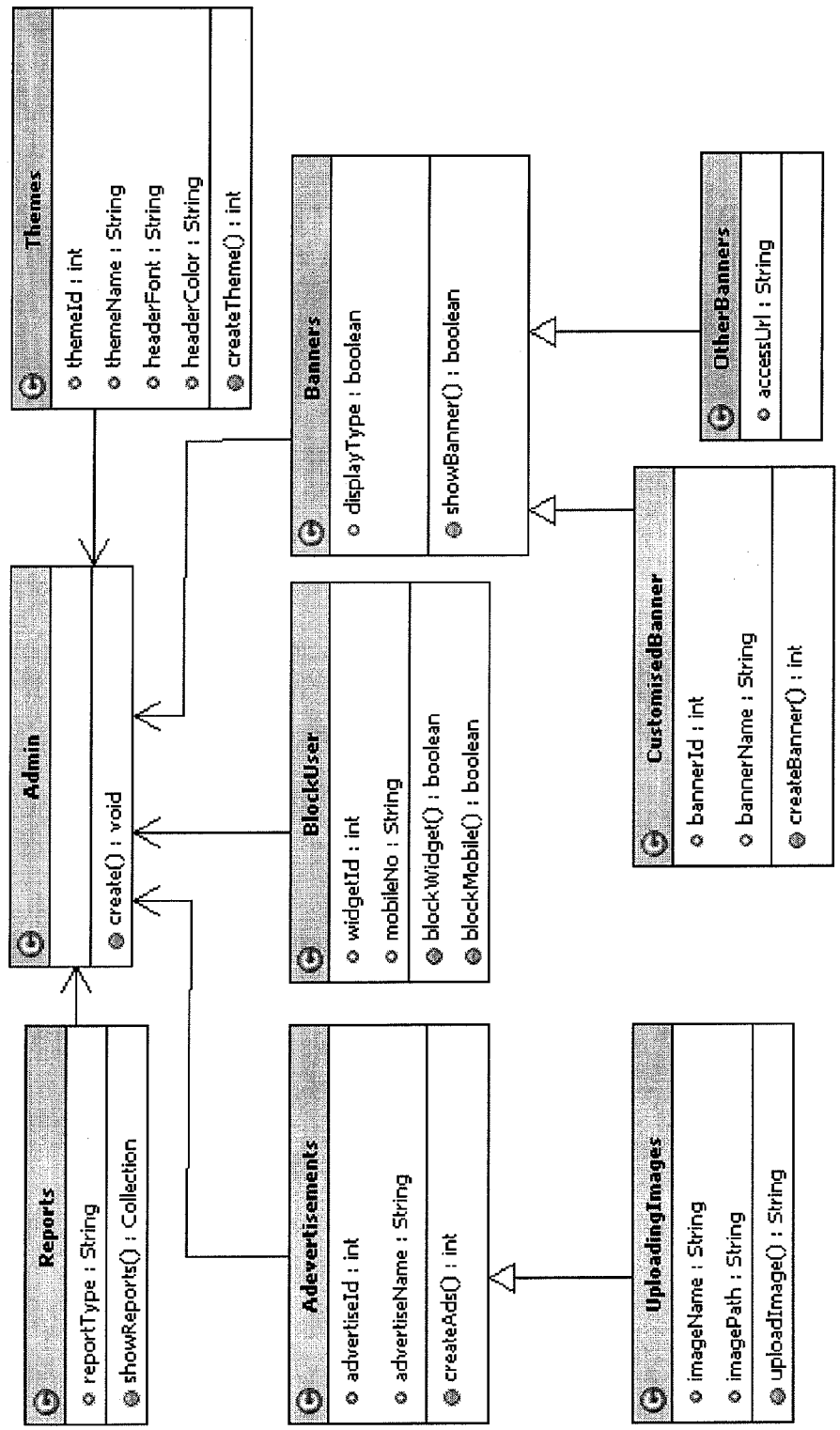
FIG. 6 is a class diagram of administrative interactions of a chat system and method.
Figure 7:
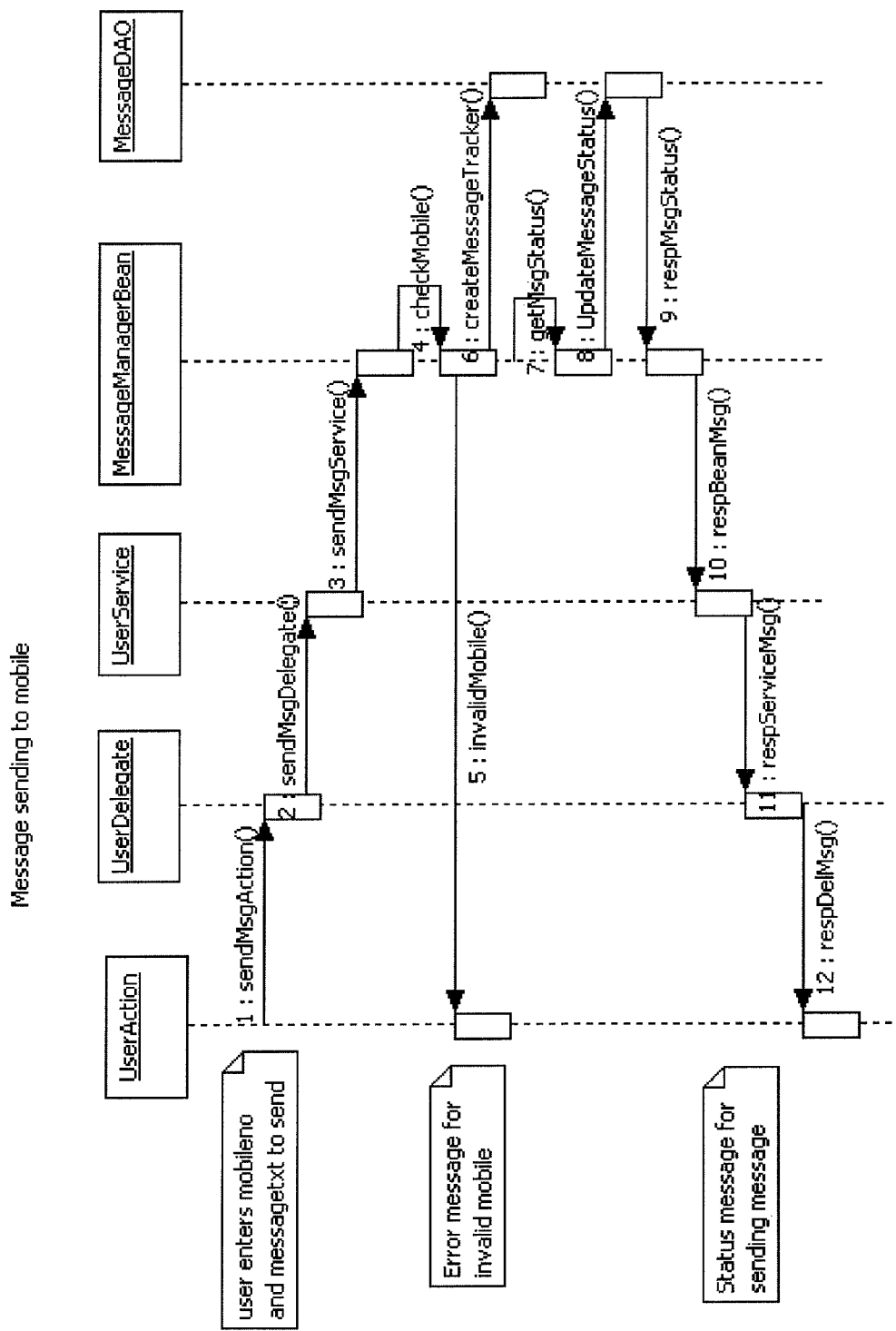
FIG. 7 is a use case diagram illustrating a user sending a message to a mobile device.
Figure 8:
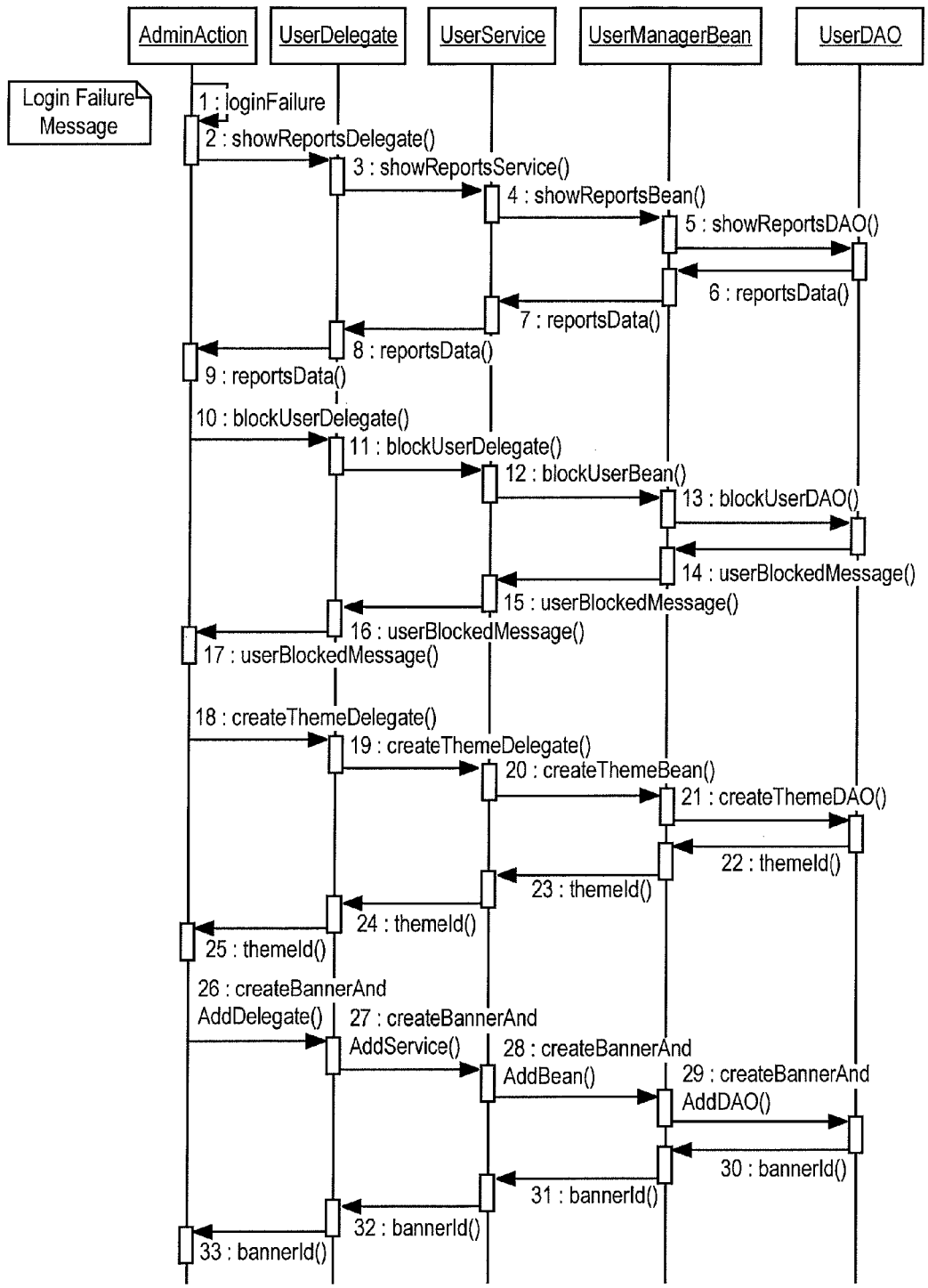
FIG. 8 is a use case diagram illustrating administrator access for themes, banner, reports, etc.
Figure 9:
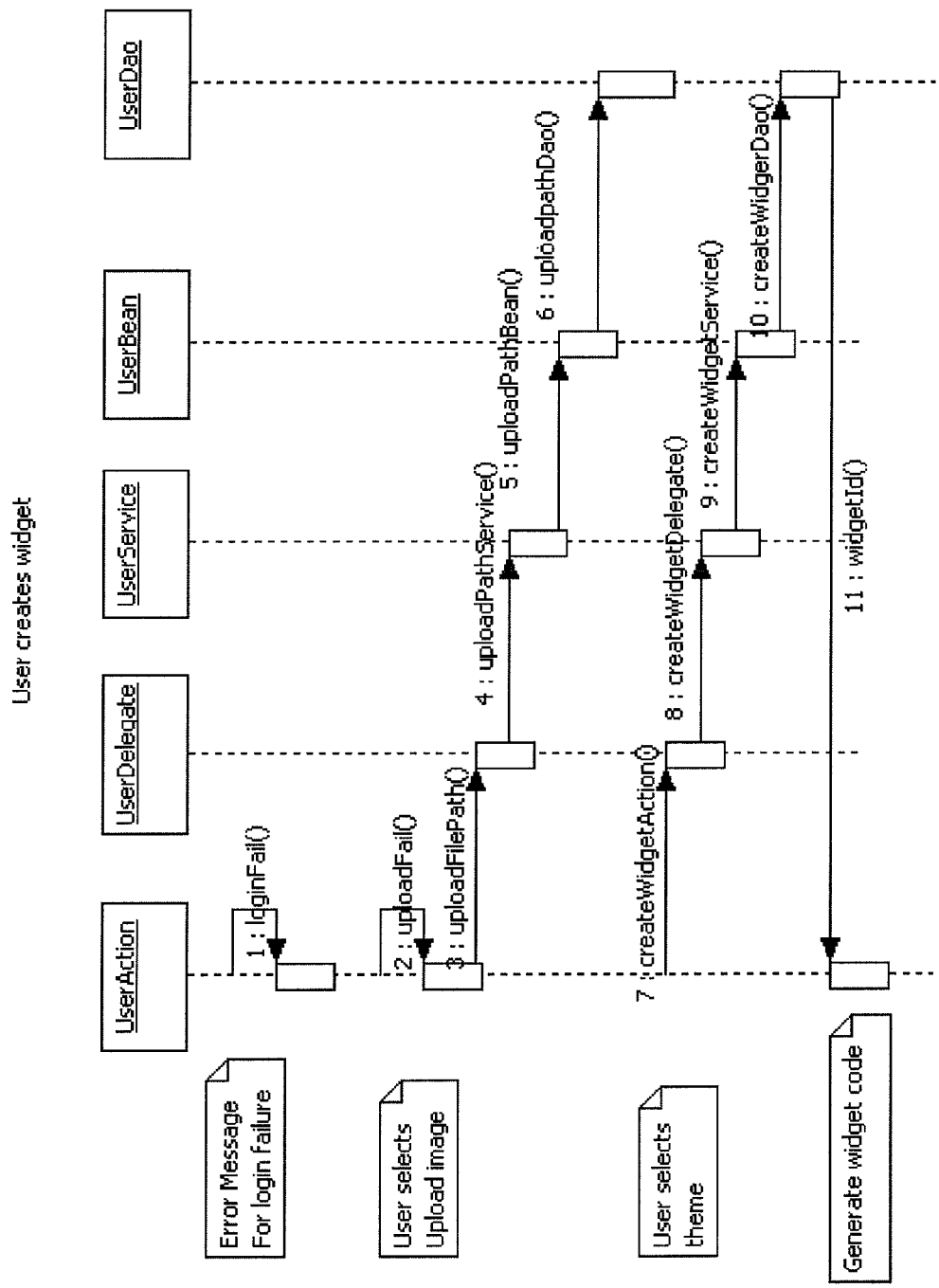
FIG. 9 is a use case diagram illustrating a user creating a widget.

FIG. 6 is a class diagram of administrative interactions of a chat system and method. FIGS. 7-9 illustrate various use cases. FIG. 7 is a use case diagram illustrating a user sending a message to a mobile device. FIG. 8 is a use case diagram illustrating administrator access for themes, banner, reports, etc. FIG. 9 is a use case diagram illustrating a user creating a widget.

FIG. 10A illustrates the system functions that are performed under direction of an admin use, which covers security and blocking users in the system, generation of valid reports, and, on the widget front, the ability to create banners/themes/Ads as well control the centralized deployment of these. FIGS. 10B and C illustrate functions that performed under direction of a regular unregistered user (FIG. 10B), and registered user (FIG. 10C) which covers sending and receiving message over the web/widget and custom widget creation by registered users for their use.

Figure 10D:
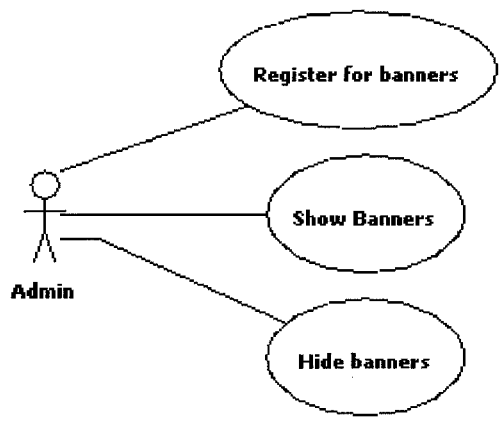

FIG. 10D illustrates banner display functions of a chat system. Specifically, the banner display functions are used to render the banner in the designated area on the widget. Banners can be of two different types: a) ad based banners, which are directly served from third party vendors and displayed on the widget; and b) rendering of customized banners on the widget from centralized banner management system. Admin can create banners, which are specific to customers (e.g., each customers can create their own banners for the widget, which can then be propagated to all required widgets as mentioned below). For customized banners if change banner in centralized system, it will effect to the all the widgets on the network. Admin can control to display or hide the banners on a widget.

Figure 10E:
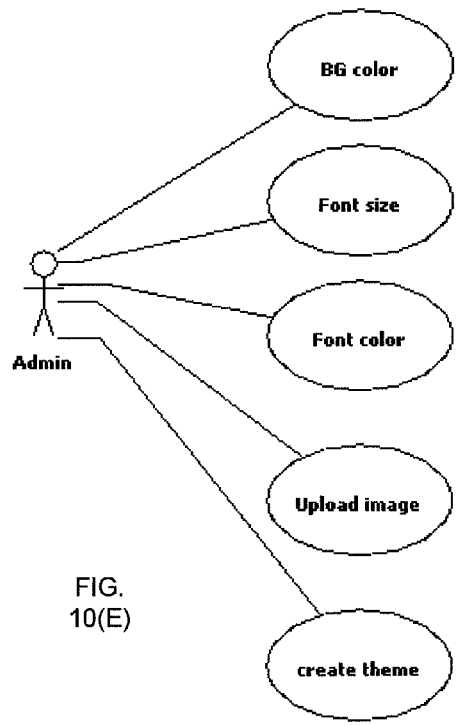

FIG. 10E illustrates skin and version management functions. Admin functions can be used to create different types of themes for the chat system widget. Creation of a theme may include selecting a back ground color, different types of font sizes (e.g., header font, text font, etc.), and uploading of any type of images. The login user has a menu to list all of the themes to select and preview the themes. Each theme will have unique id to facilitate there setup.

With regard to version management, each widget version comes with a unique set of enhancements/functionality supported and these are associated to each widget and taken care of while the each widget instance is initialized. Moreover, a set of updated themes or new themes is associated with every version. Registered users and their widgets are associated to a release version of chat system widget and controlled.

Figure 10F:
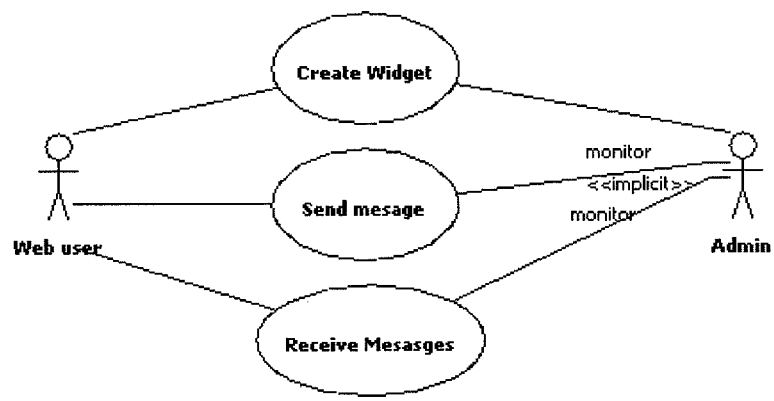

FIG. 10F illustrates report and tracking functions for traffic on each widget. The reporting and tracking function includes generating one new unique number for each created widget. Report and tracking may be accomplished by using this unique number/string to identify all message communications. The system admin function can control the spam messages and block the users/widgets. The system admin function has the privilege to monitor and generate reports on each widget or each registered user/customer.

Figure 10G:
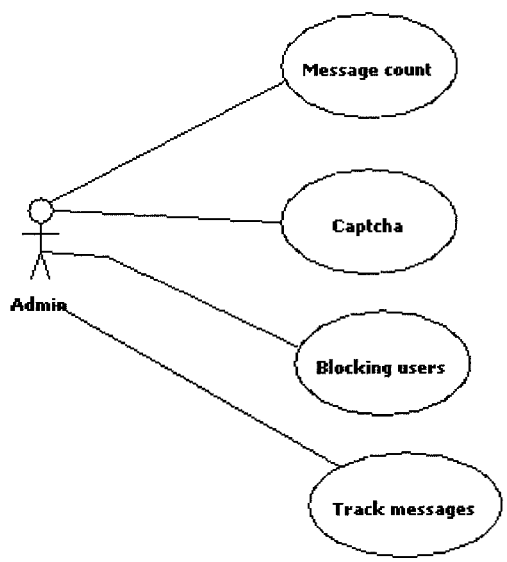

FIG. 10G illustrates chat security functions of the chat system to provide traceability to the PC-based user that includes at a minimum IP address and user-inputted identification (e.g.—user name, cell phone number, etc.). The system must correlate the IP address with user-inputted identification, and may limit use only to country-specific registered and/or geographically located mobile cellular phones. A new opt-in message may be sent after 10 successful messages, in order to restrict spam message. If the mobile user replies with some keyword (e.g., SPAM, OPTOUT, THREAT), then that kind of category count is increased for that chat user. Once the count reaches the threshold value, the system will block the user and asks the user to contact admin for reopening the account, and then Admin decides whether to reopen the account or not.

The chat application prevents automated and manual spamming of any mobile cellular phone number. By alerting with an image-based text input, such as a Captcha™ image, the conversation can be interrupted which can eliminate programmed software to misuse the application. In continuous flow mode, the chat system can randomly send the confirmation messages requesting user actions (this eliminates bots). By using a widget id, the chat system can track spam messages and restrict unauthorized users. Further, the software may be configured to protect the user from any unauthorized use, alteration, disclosure and access. Upon detection of any security breach, the system may automatically send a "stop" or "optout" message to that mobile cellular phone number.

MMA requirements. The chat application shall have an area that allows the user to review and accept the terms and conditions of use each and every time. This area may include text in a predetermined, native language (such as English), and require the user to accept the terms and conditions with every use by checking a box. If the box is not checked then the user will be unable to use the application. This will also include service levels that may be provided by the chat application. Before a chat session begins, each mobile may receive a message exchange substantially as follows:

a. "PCUSER: SMS Chat4Free? Reply "Y" or "YES" to continue. Standard text messaging applies. Terms and conditions per www.chat4free.com. To stop chat, please reply "STOP" or "OPTOUT".

b. At any time, if the mobile cellular phone user requests a "STOP" or "OPTOUT" the system will automatically send the following message:

c. CHAT4FREE: You have been OPTED OUT of this service. You will no longer receive chat system messages. If you change your mind and want to be OPTED IN, please text CHAT SYSTEM to 53137.

The chat application may implement an OPT-OUT for a user after a period of time of inactivity, i.e. 90 days. Further, for a deactivation notice, the chat application may notify an OPT-OUT user within a period of time (i.e. 3 days) of request or inactivity.

Figure 10H:
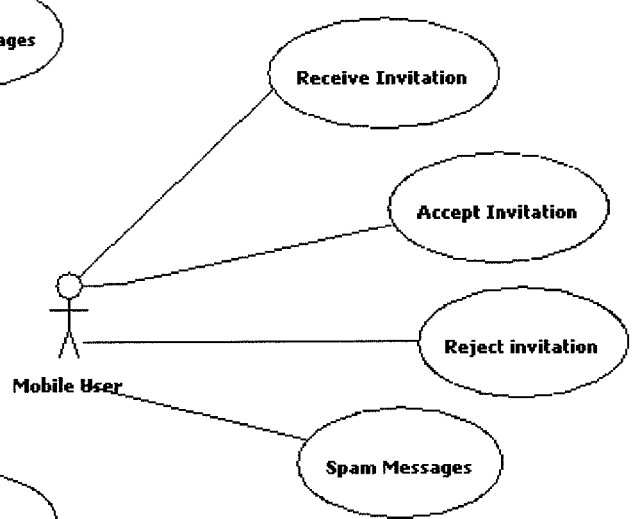

FIG. 10H illustrates OPT-OUT and OPT-IN functions of the chat system. To initiate message sending and receiving, as a first message to a mobile user, an invitation to accept a chat conversation is sent. The chat system will prompt the mobile user to reply with defined message text to start the chat. If the mobile user does not reply with a message text as expected, the chat system will ignore the mobile user and will not allow the web user to send any message to mobile user. Every conversation will be kept alive up to some idle time limit (global parameter setting), after which time further conversation will not be accepted. A new OPT-IN/OPT-OUT may be required after a period (i.e. one hour) of non-use. This parameter (e.g.—user_time_out) shall be programmable and global.

Figure 10I:
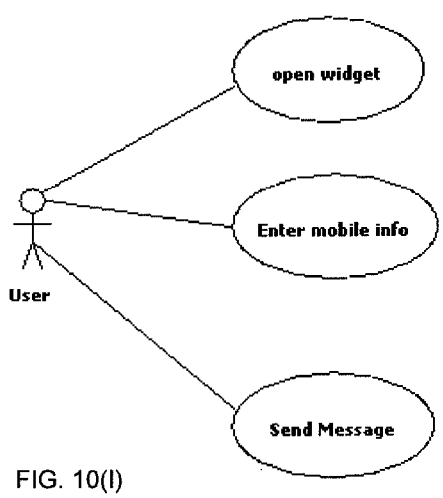

FIG. 10I illustrates a user interface (UI) and usability function of the chat system. The user opens the widget to chat with any mobile user. Each current session on the widget generates a unique identification for traceability and identification. The name of the initiator of the conversation must be keyed in, as well as the mobile number and receiving user name. This results in the opening of a chat window with two separate areas. One area is for keying in the message text and send. The other is for conversation, i.e. a listing of message texts.

Figure 10J:
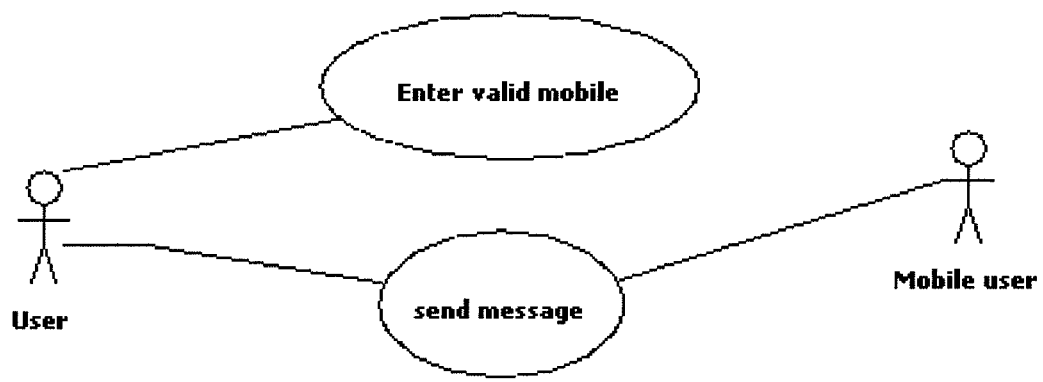

FIG. 10J illustrates functions of the chat system to send chat messages. A user enters a text message to send. The text message may be limited to a certain number of characters, i.e. 145 characters. The system authenticates the given mobile number, and checks whether any conversation is currently alive for the given mobile number. If no conversation is alive, then short code availability is determined and a new conversation is created. A text message text is sent with given message text, short code and sender name, and then the status of message text is updated.

Figure 10K:
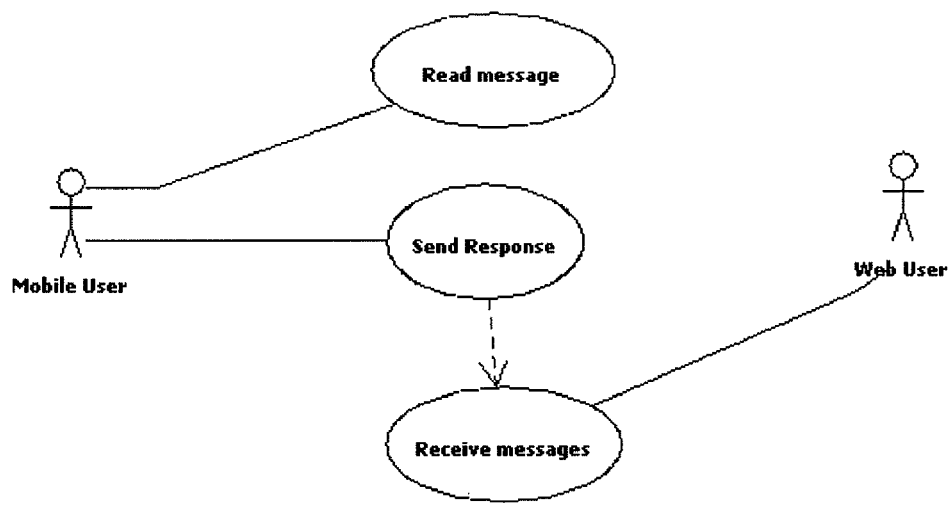

FIG. 10K illustrates functions of the chat system to receive responses. If a mobile user wants to respond for any messages, the mobile user may reply back with the message text. The response from the mobile user can include a reply for an invitation request, a reply for Opt-in and Opt-out, and/or a reply with simple message text. The response text and type is read, and the application type is checked. Then, the user and mobile number (to which the user pushed the message) is checked.

Figure 10L:
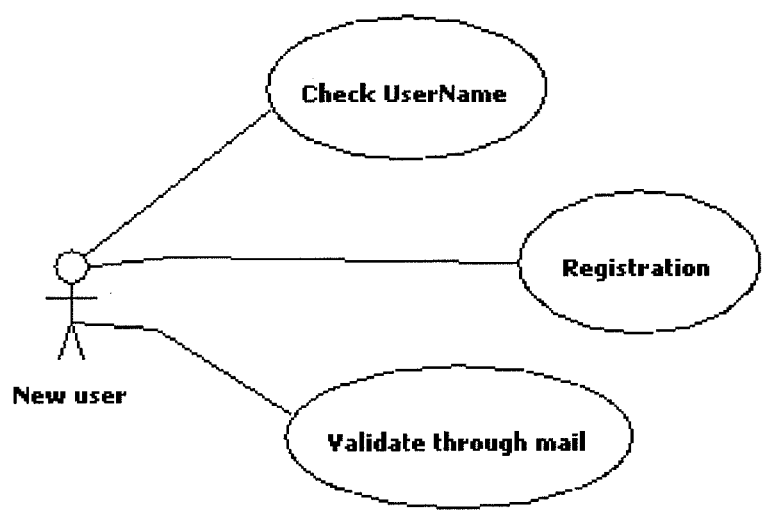

FIG. 10L illustrates user registration functions of the chat system. If the user wants to create its own widget, the user may register into the chat application. The registration process includes the chat system receiving that user's username, password, email address and valid mobile number. After successful registration of the user, an email is sent for the user with login credentials.

Figure 10M:
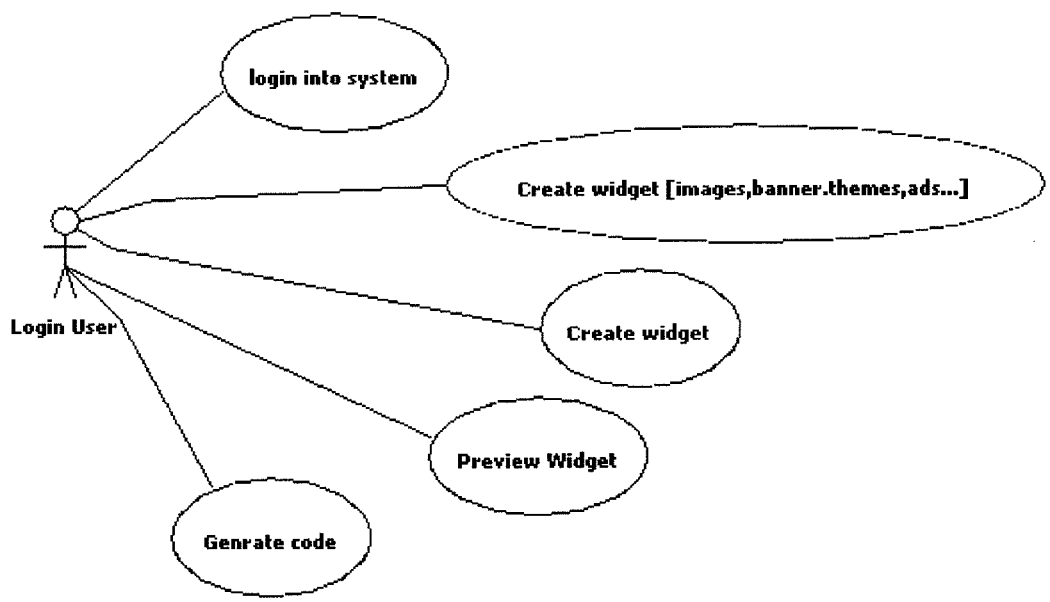

FIG. 10M illustrates new chat widget code generation functions of the chat system, upon login authentication of the user to create or new widget. If the user is authenticated, then the user is prompted to create new widget. Creating a new widget may have one or more of the following options: upload an image as background; change background color; change font of texts and color of texts; add different themes; and show banners and advertises. The generated widget may be displayed for preview to the user, and the code for the selected widget is generated. Then, the widget code can be copied and run on any device or computing platform.

The chat application generates chat items with a user interface. The user interface includes a menu bar area, which shows a menu bar. The menu bar may include at least a file menu and a help menu. In some implementations, the file menu includes some or all of the following functional selections: a) Start New Chat; b) Search; c) All Contacts; d) Customize (themes); e) Delete; and f) Exit or Sign Out. The help menu includes some or all of the following functional selections: a) Help; b) About; and c) Terms and Conditions.

The user interface further includes a Chat Area: each chat window contains a Name or a Mobile Number to send messages. This window contains two separate parts, one for a list of chat messages and one for message text to send. The user interface may further include a logo area, in which logos or videos may be displayed, an advertisement area, also containing video clips, graphics or images, and a banner area. The user interface may also include tabs or contacts to show "send" and "response" messages, server alerts, etc., and contains the "message area" and "send" buttons.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method comprising:
receiving, from a chat application on a computer, a message including one or more internet protocol packets and a short code;
aggregating the short code with a long code including a carrier code identifying a mobile node; and
connecting, based on the long code and the carrier code, to the mobile node to initiate a two-way chat session between the chat application and the mobile node;
sending a short message service message including the long code and the carrier code to the mobile node via an overhead channel.

2. The method of claim 1, wherein the receiving further comprises:
receiving, at a server, the short code to initiate the two-way chat session with the mobile node, wherein the short code identifies a short message service destination for the two-way chat session, and wherein the long code and the carrier code identifies a destination phone number of the mobile node on a mobile wireless network, wherein the destination phone number is in accordance with E.164.

3. The method of claim 1, wherein the overhead channel is a paging channel.

4. A method comprising:
receiving, from a chat application on a computer, a message including one or more internet protocol packets and a short code;
aggregating the short code with a long code including a carrier code identifying a mobile node; and
connecting, based on the long code and the carrier code, to the mobile node to initiate a two-way chat session between the chat application and the mobile node, wherein the connecting further comprises providing at least one circuit-switched connection to the mobile node and at least one packet switch connection to the chat application on the computer.

5. The method of claim 4, wherein the receiving further comprises:
receiving, at a server, the short code to initiate a chat session with the mobile node, wherein the short code identifies a short message service destination for the two-way chat session, and wherein the long code and the carrier code identifies a destination phone number of the mobile node on a mobile wireless network, wherein the destination phone number is in accordance with E.164.

6. The method of claim 4, wherein the overhead channel is a paging channel.

7. An apparatus comprising:
at least one processor; and
at least one memory, wherein the at least one processor and the at least one memory provide a method comprising:
receiving, from a chat application on a computer, a message including one or more internet protocol packets and a short code;
converting the received short code to a long code and a carrier code identifying a mobile node;
connecting, based on the long code and the carrier code, to the mobile node to initiate a two-way chat session between the chat application and the mobile node; and
sending a short message service message including the long code and the carrier code to the mobile node via an overhead channel.

8. The apparatus of claim 7, wherein the receiving further comprises:
receiving, at a server, the short code to initiate the two-way chat session with the mobile node, wherein the short code identifies a short message service destination for the two-way chat session, and wherein the long code and the carrier code identifies a destination phone number of the mobile node on a mobile wireless network, wherein the destination phone number is in accordance with E.164.

9. The apparatus of claim 7, wherein the overhead channel is a paging channel.

10. An apparatus comprising:
at least one processor; and
at least one memory, wherein the at least one processor and the at least one memory provide a method comprising:
receiving, from a chat application on a computer, a message including one or more internet protocol packets and a short code;
converting the received short code to a long code and a carrier code identifying a mobile node;
connecting, based on the long code and the carrier code, to the mobile node to initiate a two-way chat session between the chat application and the mobile node, wherein the connecting further comprises providing at least one circuit-switched connection to the mobile node and at least one packet switch connection to the chat application on the computer.

11. A method comprising:
receiving, via a paging channel, a request to initiate a two-way chat with a chat application on a computer, the paging channel identifying a long code and a carrier code of a mobile node, the long code and the carrier code corresponding to the mobile node; and
establishing the two-way chat between the mobile node and the chat application using a short code corresponding to the application server.

12. The method of claim 11, wherein the establishing further comprises:
establishing the two-way chat, when the mobile node provides an indication and confirmation representative of an opt-in.

13. An apparatus comprising:
at least one processor; and
at least one memory, wherein the at least one processor and the at least one memory provide a method comprising:
receiving, via a paging channel, a request to initiate a two-way chat with a chat application on a computer, the paging channel identifying a long code and a carrier code of a mobile node, the long code and the carrier code corresponding to the mobile node; and
establishing the two-way chat between the mobile node and the chat application using a short code corresponding to the application server.

14. The apparatus of claim 13, wherein the establishing further comprises:

establishing the two-way chat, when the mobile node provides an indication and confirmation representative of an opt-in.

15. A method comprising:

sending, by a chat application on a computer, a request to initiate a two-way chat with a mobile node, the request sent through a packet switched network using a short code and through a circuit switched network using a long code and a carrier code, the long code and the carrier code representing an E.164 phone number identifying the mobile node; and establishing the two-way chat between the mobile node and the chat application using the short code corresponding to the application server.

16. The method of claim 15, wherein the sending further comprises:

sending the request including the long code and the carrier code of the mobile node via a paging channel.

17. The method of claim 15, wherein the establishing further comprises:

establishing the two-way chat when the chat application determines that communications with the mobile node is not spam.

18. An apparatus comprising:

at least one processor; and at least one memory, wherein the at least one processor and the at least one memory provide a method comprising:

sending, by a chat application on a computer, a request to initiate a two-way chat with a mobile node, the request sent through a packet switched network using a short code and through a circuit switched network using a long code and a carrier code, the long code and the carrier code representing an E.164 phone number identifying the mobile node; and establishing the two-way chat between the mobile node and the chat application using a short code corresponding to the application server.

19. The apparatus of claim 18, wherein the sending further comprises:

sending the request including the long code and the carrier code of the mobile node via a paging channel.

20. The apparatus of claim 18, wherein the establishing further comprises:

establishing the two-way chat when the chat application determines that communications with the mobile node is not spam.

21. An apparatus comprising:

at least one processor; and at least one memory, wherein the at least one processor and the at least one memory provide a method comprising:

receiving, from a chat application on a computer, a message including one or more internet protocol packets and a short code;

aggregating the short code with a long code including a carrier code identifying a mobile node; and connecting, based on the long code and the carrier code, to the mobile node to initiate a two-way chat session between the chat application and the mobile node, wherein the connecting further comprises providing at least one circuit-switched connection to the mobile node and at least one packet switch connection to the chat application on the computer.

* * * * *